ated Sept. 28, 1971

United States Patent

[11] 3,609,149

| [72] | Inventors | Yutaka Matsui<br>Hyogo;<br>Kiyoshi Yasuda, Osaka; Jugo Goto, Osaka,<br>all of Japan |
|---|---|---|
| [21] | Appl. No. | 856,833 |
| [22] | Filed | Sept. 10, 1969 |
| [45] | Patented | Sept. 28, 1971 |
| [73] | Assignee | Takeda Chemical Industries, Ltd.<br>Osaka, Japan |
| [32] | Priority | Sept. 11, 1968 |
| [33] | | Japan |
| [31] | | 43/65366 |

[54] METHOD FOR PRODUCING ORGANIC ISOCYANATE POLYMERS
8 Claims, No Drawings

[52] U.S. Cl. ................................................. 260/248 NS,
260/77.5 NC, 260/77.5 AC

[51] Int. Cl. ........................................................ C07d 55/38
[50] Field of Search ............................................ 260/248
NS, 77.5 NC, 77.5 AC

[56] References Cited
UNITED STATES PATENTS

| 3,211,703 | 10/1965 | Gilman et al. ................ | 260/248 X |
| 3,259,625 | 7/1966 | Ugi et al. ...................... | 260/248 |
| 3,330,828 | 7/1967 | Grogler et al. ................ | 260/248 |

*Primary Examiner*—John M. Ford
*Attorney*—Wenderoth, Lind & Ponack

ABSTRACT: This invention relates to the production of isocyanate polymers. Xylylene ω, ω'-diisocyanate trimers are produced that are devoid of 1-nylon-type polymers. Xylylene ω, ω'-diisocyanate is contacted with a trimerization catalyst and a 1-nylon-formation suppressor selected from acid amides, acid imides, ureides, thioureides or mixtures thereof.

METHOD FOR PRODUCING ORGANIC ISOCYANATE POLYMERS

DESCRIPTION OF THE INVENTION

This invention relates to a method for producing organic isocyanate polymers. More concretely, the present invention is concerned with a method for producing soluble xylylene ω,ω'-diisocyanate polymers devoid of formation of insoluble 1-nylon-type polymers.

Organic isocyanate polymers are compounds of considerably commercial importance, and particularly the polymers having free isocyanato groups have been widely used as starting materials in the production of various polyurethanes.

Among them, xylylene ω,ω'-diisocyanate is of particular interest in rendering a polyurethane which has, on one hand, good physiological properties and is, on the other hand, not yellowed even after its exposure to atmosphere for a long period of time. However, the high reactivity of xylylene ω,ω'-diisocyanate induces undesirable reactions in the course of polymerization or during storage. Particularly, the trimerization of the isocyanate is accompanied by a secondary reaction which will give rise to a high polymer of the so-called 1-nylon type which is insoluble in a conventional solvent for organic polyisocyanates. When this once occurs, the viscosity of the system increases so much that it is no longer possible to obtain a commercially useful product. Due to this peculiar nature of the xylylene ω,ω'-diisocyanate, it was practically impossible to obtain a xylylene ω,ω'-diisocyanate trimer which is substantially free from the 1-nylon-type polymer.

It has now been discovered that when the trimerization reaction of xylylene ω,ω'-diisocyanate is conducted in the presence of a small amount of a specific imino-containing compound, the formation of the 1-nylon-type polymer is successfully suppressed and the desired trimerization is selectively allowed to take place to yield a polymer which is soluble in a conventional solvent such as ethyl acetate and which possesses a long pot life.

Therefore, the principal object of the present invention is to provide a method for producing a xylylene ω,ω'-diisocyanate polymer which is soluble in a conventional solvent, devoid of substantial formation of the insoluble 1-nylon-type polymer.

It is another object of this invention to provide xylylene ω,ω'-diisocyanate polymers which are completely soluble in a conventional solvent and which do not substantially contain the insoluble 1-nylon polymer.

Said objects are realized by bringing xylylene ω,ω'-diisocyanate into an intimate contact with a small but effective amount of an imino-containing compound detailed below as a 1-nylon formation suppressor, in the presence of a trimerization catalyst.

The imino-containing compounds to be employed as the 1-nylon formation suppressor in this method include organic acid amides, organic acid imides, ureides and thioureides, and from the practical point of view the preferable are those of low molecular weight below the limit of about 500 but higher than 45.

From the easiness in conducting the method of this invention as well as from the economical viewpoint, the advantageous among said lower organic acid amides may be shown by the following formulas:

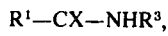

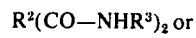

wherein X represents O or S; R¹ represents H, an alkyl of at most 12 carbon atoms (e.g. methyl ethyl, propyl, butyl, octyl, etc.), an aryl of at most 10 carbon atoms (e.g. phenyl, naphthyl, etc.), an alkyl or aryl group substituted for by one or more of halogens (e.g. F, Cl, Br, etc.), —NO₂, —CN, an alkyl (e.g. methyl, ethyl, etc.), or an alkoxy (e.g. methoxy, ethoxy, etc.); R² represents a bond between the two —CO— groups or a bivalent hydrocarbon residue of at most 6 carbon atoms (e.g. methylene, ethylene, ethenylene, phenylene, etc.) and R³ represents H, phenyl or a phenyl substituted for by one or more of halogens, —NO₂, —CN or an alkyl or alkoxy as exemplified above.

Similarly, the advantageous imides or ureides or thioureides are those which have a five- or six-membered ring in which is included a group represented by the formula:

$$-A-NH-B-$$

wherein A is —CO—, —CS— or —SO₂— and B is —CO— or —CS—.

Thus, examples of the imino-containing compounds include, among others, various carboxylic acid amides such as acetamide, chloroacetamide, dichloroacetamide, benzamide, formamide, propionamide, malonamide, n-butyramide, fluoroacetamide, maleic monoamide, maleic diamide, oxamide, N-phenylacetamide, etc., various thiocarboxylic acid amides such as thioformamide, thioacetamide, thiobenzamide, etc.; various sulfonic acid amides such as benzenesulfonamide, o-toluenesulfonamide, p-toluenesulfonamide, sulfanilic acid, benzenesulfonanalide, p-toluenesulfonanilide, o-toluenesulfonanilide, etc., various organic acid imides such as succimide, phthalimide, maleimide, o-benzoic sulfimide, etc., various barbiturates such as barbituric acid, phenobarbital, barbital, thiobarbituric acid, thiobarbital, etc., various uracils as uracil, 5-methyluracil, 4-aminouracil, 4-methyl-5-ethylthiouracil, 4-aminothiouracil, etc.; various orotates such as orotic acid, ethyl orotate, phenyl orotate, etc.; various isocyanurates such as isocyanuric acid, n-butylisocyanuric acid, benzylisocyanuric acid, di-n-butylisocyanuric acid, dibenzylisocyanuric acid, monochloroisocyanuric acid, dichloroisocyanuric acid, etc., and various five-membered ureides such as parabanic acid, hydantoin, etc. Among those imino-containing compounds as enumerated above, such a compound that contains a group of —SO₂—NH— is most advantageously employed.

In the method of this invention, for the purpose of conducting the trimerization reaction selectively, the imino-containing compound described above is added to the reaction system in an effective amount ranging from about 0.001 to 1.0 percent by weight, preferably from about 0.01 to 0.1 percent by weight, relative to the xylylene ω,ω'-diisocyanate in one lump sum or in installments under agitation so as to bring the components into an intimate contact with each other. There is an inclination that at the initial stage of the trimerization the presence of a relatively low concentration of the imino-containing compound will suffice the purpose, but the more vigorously the reaction takes place, the more the imino-containing compound will be required. It is therefore a recommendable modification that the trimerization is initiated with the addition of a small portion of the imino-containing compound and then the remaining major portion thereof is supplemented as the reaction proceeds.

The starting xylylene ω,ω'-diisocyanate may be any of o-, m- and p-isomers or a mixture of more than one of them. Among those, easily available are the p-isomer and a mixture of m- and p-isomers.

Any catalyst may be employed in the method of this invention, so long as it is commonly used in the trimerization of organic isocyanates. For instance, the metallic salts of carboxylic acids, e.g., sodium acetate, lead octoate, calcium naphthenate, etc.; the alkoxides or phenoxides of alkali or alkaline earth metals, e.g., sodium methoxide, sodium phenoxide, etc.; the metallic salts of compounds capable of enolization, e.g., sodium acetylacetonate, etc.; tertiary amines, e.g., triethylamine, triethylenediamine, etc.; quaternary ammonium bases, e.g., tetraethylammonium hydroxide etc.; organic phosphorus compounds, e.g., triethylphosphine, etc.; the organometallic compounds of tin, antimony, etc., e.g., trimethyl(dimethylamino)-tin tributyl-antimony oxide, etc., by way of example.

While the amount of the catalyst should vary with the activity of the catalyst among other factors, it should generally lie within the range of about 0.002 to 5.0 percent by weight relative to the isocyanate and, for better results, within the range of about 0.01 to 1.0 percent by weight. In addition to such catalyst, it is also permissible to employ a promoter, which may be any of aliphatic alcohols (e.g., methanol, ethanol or the like), phenols (e.g., phenol, cresol or the like), monohalogenated phenols (e.g., p-chlorophenol, m-bromophenol or the like), aldehydes (e.g., p-propionaldehyde, acrolein or the like), oximes (e.g., methyl ethyl ketoxime, acetoxime or the like), alkylene oxides (e.g., ethylene oxide, propylene oxide or the like), etc. in an amount ranging from the same amount to 500 times as much as said catalyst and, for better results, from the same amount to about 100 times. The reaction temperature is preferably maintained at the lowest temperature that is practical from the standpoint of the reaction velocity attainable below the limit of 200 °C.

While this reaction proceeds either in the presence or absence of a solvent, it is generally advantageous to employ a suitable solvent which will not adversely affect the reaction. The solvent mentioned just above may be any of such esters as ethyl acetate, butyl acetate, 2-ethoxyethyl acetate, etc., various ketones such as acetone, methyl ethyl ketone, methyl isobutyl ketone, etc., such others as ethyl ether, dioxane, etc., and such aromatic hydrocarbons as benzene, xylene, toluene and the like.

When the trimerization proceeds on xylylene $\omega$, $\omega'$-diisocanate, the primary trimer unit is supposed to be a compound of the formula:

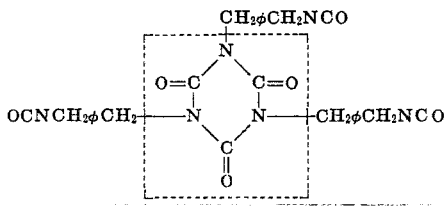

wherein $\Phi$ represents a phenylene group, and as the primary trimer is also a polyisocyanate, it can further be secondarily trimerized in a similar manner to give a still high molecular product of three-dimensional structure. In any case, however, the trimerization products have such an isocyanuric ring in their structure, as shown in the dotted line on the above formula, and its formation can be detected by way of the infrared absorption at a wave number of ca. 1,700 cm.[11]. In this specification, the term "trimerization" is to be construed as including both the primary trimerization and the secondary trimerization as far as the resulting products have the isocyanuric ring in their basic structure and are soluble in such a conventional solvent as ethyl acetate, and such product is referred to as "trimer."

In order to obtain a desired polymer of a suitable molecular weight, it is required to terminate the trimerization reaction. The reaction can be terminated by the addition of an acid (e.g., phosphoric acid, hydrochloric acid, formic acid, acetic acid, propionic acid, maleic acid, phthalic acid, fumaric acid, etc.), an acid anhydride (e.g., maleic anhydride, phthalic anhydride, acetic anhydride, etc.), an acid chloride (e.g., benzoyl chloride, acetyl chloride, chloroacetyl chloride, dichloroacetyl chloride, etc.) or pentachlorophenol, to name but a few, within the range of 0.01 to 1.0 percent by weight relative to the diisocyanate.

The present invention is further explained by way of the following examples which are not to be construed as limitative but are solely for the purpose of illustration. In the examples, "part" or "parts" is on a weight basis unless otherwise noted.

EXAMPLE 1

To 100 parts of xylylene $\omega$, $\omega'$-diisocyanate (a mixture of 70% m-isomer and 30% p-isomer) is added one part of ethyl acetate which contains 0.09 part of benzenesulfonanilide and 0.3 part of lead octoate (lead content 38%), and the mixture is agitated in a dry nitrogen atmosphere at 60 °C. for 10 hours. Then, 0.5 part of acetic acid is added to the reaction mixture so as to terminate the reaction.

The reaction product shows an NCO content of 33.2% (NCO content prior to the reaction 44.3%) and a viscosity of 85 cps. (25 °C.). After 7 days' standing, no increase in viscosity is observed. The infrared absorption spectrum of the product shows a strong absorption band in the neighborhood of 1,700 cm.[11]. The product is readily soluble in ethyl acetate.

Alternatively, the same procedure as above is repeated except that the 0.09 part of the benzenesulfonanilide is added dividedly into two portions: the first 0.025 part being added prior to the reaction and the rest 0.065 part 1 hour after the initiation of the reaction. The 10mixture obtained after the 10-hour reaction is homogeneous, and shows an NCO content of 30.1%.

As a control, a similar reaction is conducted without the addition of benzenesulfonanilide. The result shows that the NCO content of the product is 38.4%, with its viscosity being 500 c.p.s. (25° C.).

This product is almost insoluble in ethyl acetate and is observed to contain, the 1-nylon-type polymers formed.

EXAMPLE 2

To a mixture of 50 parts of xylylene $\omega$, $\omega'$-diisocyanate (a mixture of 70% m-isomer and 30% p-isomer) and 50 parts of acetone are added 0.1 part of barbital and 0.05 part of sodium methoxide, and the resulting mixture is heated in a dry nitrogen atmosphere at 60° C. for 1 hour. The reaction product has an NCO content of 11.9% (NCO content prior to the reaction: 22.3%), and the reaction mixture is transparent. This reaction is concentrated under reduced pressure, and the infrared absorption spectrum is measured. The result shows a strong absorption characteristic of an isocyanurate group in the neighborhood of 1,700 cm.[11].

On the other hand, a similar reaction is conducted for 30 minutes without the addition of barbital.

The NCO content of the product is 14.3%, the insoluble 1-nylon-type polymer being obtained as precipitates.

EXAMPLE 3

To a mixture of 50 parts of xylylene $\omega$, $\omega'$-diisocyanate (70% m- and 30% p- ) and 50 parts of butyl acetate (NCO content of the mixture: 22.4%), there is added 6.9 parts of 2-ethylhexanol, and the whole mixture is stirred in a dry nitrogen atmosphere of 60° C. for 2 hours. Then, to the mixture is added 0.04 part of tetraethylammonium hydroxide, while keeping the stirring under the same conditions. Ten minutes later, there is further added 0.2 part of trichloroacetamide, and the stirring at 60° C. is further continued for 3 hours. The resulting reaction mixture is homogeneous and clear, showing an NCO content of 5.7% and a viscosity of 100 c.p.s. (at 25° C.).

As a control, a similar reaction is conducted without the addition of trichloroacetamide. The resultant reaction mixture becomes turbid and shows that the NCO content is 6.1%, with the viscosity of 150 cps. (at 25°C.).

EXAMPLE 4

To 100 parts of xylylene $\omega$, $\omega'$-diisocyanate (as mixture of 70% m-isomer and 30% p-isomer) is added 0.5 part of lead octoate (lead content 38%), and the resulting mixture is stirred in a dry nitrogen atmosphere at 60° C. for 10 hours. The reaction product has an NCO content of 32.4% (44.5% before reaction). This reaction mixture shows white turbidity upon addition of 200 parts ethyl acetate, owing to the formation of the 1-nylon-type polymer. However, when one of the additives set forth below in the table is added along with lead octoate, the reaction product contains no polymer of the 1-nylon type, being entirely the desired trimer which is soluble in ethyl acetate.

| Additive | Amount (parts) | Reaction product | |
|---|---|---|---|
| | | NCO content (percent) | Appearance when dissolved in 1,000 parts of ethyl acetate |
| None (control) | | 32.4 | Turbid. |
| Thioformamide | 0.1 | 32.2 | Clear. |
| Benzenesulfonanilide | 0.1 | 34.5 | Do. |
| Barbital | 0.1 | 33.6 | Do. |
| Chloroacetamide | 0.1 | 38.2 | Do. |
| p-Toluenesulfonamide | 0.1 | 30.1 | Do. |
| Malonamide | 0.1 | 35.6 | Do. |
| Thiobarbital | 0.1 | 36.2 | Do. |
| o-Benzoic sulfimide | 0.1 | 31.4 | Do. |

EXAMPLE 5

To a mixture (NCO content: 22.3%) of 50 arts of xylylene ω, ω'-diisocyanate (70% m- and 30% p-) and 50 parts of ethyl acetate are added 1 part of lead octoate (lead content 38%) and a varying amount of benzenesulfonamide as the 1-nylon-formation suppressor, and the resulting mixture is subjected to the reaction in a dry nitrogen atmosphere at 25° C. for 50 hours. The result is shown in the following table.

| Amount of benzenesulfonamide added (parts) | Reaction product | |
|---|---|---|
| | NCO content (percent) | Appearance |
| 0 | 20.4 | Turbid. |
| 0.08 | 16.4 | Clear. |
| 0.15 | 13.2 | Do. |
| 0.30 | 16.7 | Do. |
| 0.60 | 21.8 | Do. |
| 1.20 | 22.2 | Do. |

It is observed from the result that when no suppressor is added, the resulting reaction mixture becomes turbid, indicating the formation of 1-nylon-type polymers, and that when 1.20 parts of benzenesulfonamide (i.e., 2.4% relative to the isocyanate monomer) is added, there occurs no substantial reaction. Similar results are obtained using stannous octoate or zinc octoate in place of lead octoate.

What is claimed is:

1. A method for producing soluble xylylene ω, ω'-diisocyanate trimers devoid of producing insoluble 1-nylon-type polymers, which comprises bringing xylylene ω, ω'-diisocyanate into intimate contact with a member, as a 1-nylon-formation suppressor, selected from the group consisting of an acid amide, an acid imide, a ureide, a thioureide and a mixture thereof, each suppressor being of a molecular weight lower than 500, in the presence of a trimerization catalyst at temperature below about 200° C.; the amount of said suppressor being about 0.001 to 1.0 percent by weight relative to the isocyanate.

2. The method according to claim 1, wherein the amount of the trimerization catalyst is about 0.002 to 5.0 percent by weight relative to the xylylene ω, ω'-diisocyanate.

3. The method according to claim 1, wherein the amount of the 1-nylon-formation suppressor is about 0.01 to 0.1 percent by weight relative to the xylylene ω, ω'-diisocyanate.

4. The method according to claim 1, wherein the 1nylon-formation suppressor contains a group of the formula:

in its molecule.

5. The method according to claim 4, wherein the compound is benzenesulfonamide.

6. The method according to claim 4, wherein the compound is benzenesulfonanilide.

7. The method according to claim 4, wherein the compound is toluenesulfonamide.

8. The method according to claim 4, wherein the compound is o-benzoic sulfimide.